2,202,168

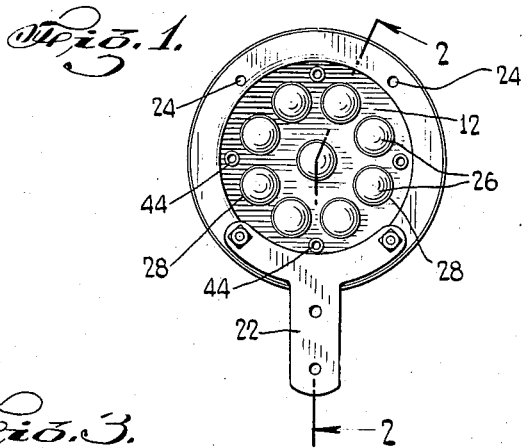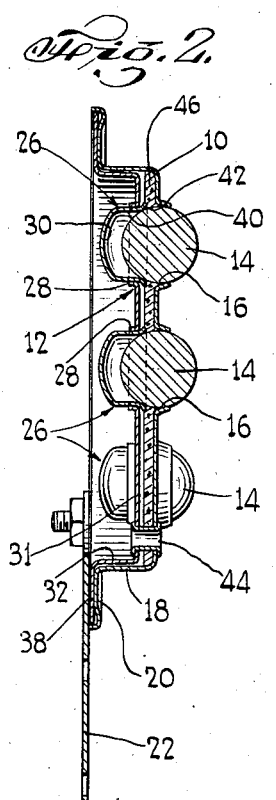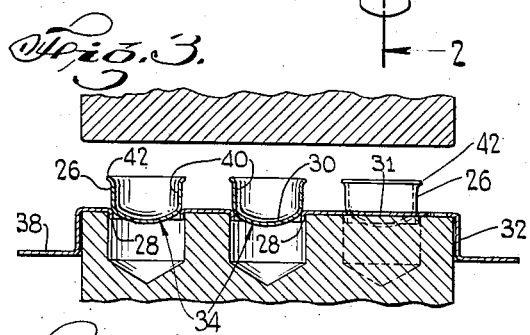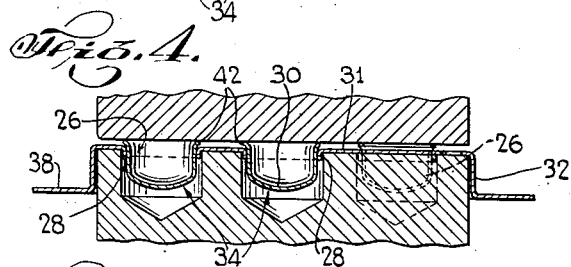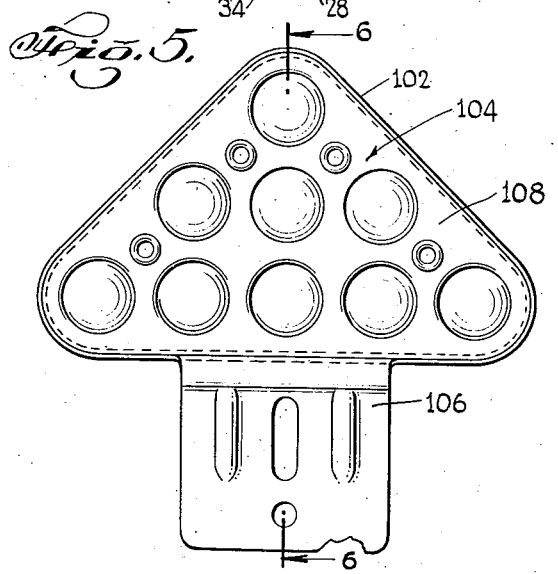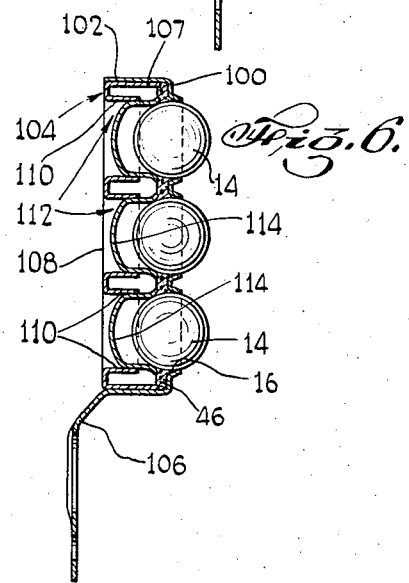
INVENTOR
LOUIS J. RAUCH
PHILIP RAUCH
BY
Hammond & Littell
ATTORNEYS Patented May 28, 1940

UNITED STATES PATENT OFFICE 2,202,168

REFLECTOR DEVICE

Louis J. Rauch and Philip Rauch, Brooklyn, N. Y.

Application March 30, 1939, Serial No. 264,891

3 Claims. (Cl. 88—82)

This invention relates to signalling or indicating devices of the type which give a signal or indication by light reflection and. are used as warning devices on vehicles, as highway signs for day and night indication of road conditions to approaching vehicles, as advertising signs and the like.

Several well known forms of these devices are composed of a series of suitably mounted reflecting units, each consisting of a glass lens and an individual supporting casing which embraces the lens and holds it in proper spaced relation to a reflecting surface on the inside of the casing. These reflecting units are usually mounted in groups with their lenses projecting through openings in the front wall of the device, means such as an inside partition or a back wall being provided to hold them in place and prevent dislocation thereof.

An object of the present invention is to provide an improved type of reflector construction which possesses optimum strength, durability and reflecting efficiency, and at the same time is more easily and more economically manufactured than the above mentioned or other acceptable devices known to the art. Thus it is a particular object of the invention to dispense with the said individual reflecting units and to provide a construction enabling simultaneous nesting and focusing of the entire series of lenses while avoiding practical obstacles in manufacturing operations.

Another object of the invention is to provide an improved reflector construction composed of a few parts which may be force-fitted together in a permanently compact and shock resisting unit without danger of impairing the uniform reflecting power and focus of the lenses.

Illustrative details of reflector constructions embodying the invention are shown in the accompanying drawing and described hereinafter, while the essentials and scope of the invention are set forth in the appended claims. In the drawing, Figure 1 is a rear elevation of one embodiment of the invention.

Figure 2 is a slightly enlarged section taken along the line 2—2 of Figure 1.

Figure 3 is a section through one of the mounting elements of the device, indicating the first step in combining it with reflecting cups in order to form the back wall.

Figure 4 shows the next step in forming the back wall.

Figure 5 is a rear elevation of another embodiment of the invention, and

Figure 6 is a sectional view on the line 6—6 of Figure 5.

Figures 1 to 4 of the drawing illustrate a warning device or reflector embodying our invention, which is adapted particularly for use on vehicles. The device consists essentially of only a few parts, including a front wall 10, a back wall 12 and a group of lenses 14. The front wall is formed with a series of openings 16 which are arranged in accordance with the desired design of the lenses and are of a size adapted to confine the lenses behind the front wall while permitting parts thereof to project beyond the margins of the openings. The front wall preferably has integral extensions constituting a side enclosure 18 and, when desired, a marginal flange 20 for use in attaching the device to supporting structure, either by means of a bracket 22 secured to flange 20 or by means of fastening elements passing through openings 24 in the flange and secured to an adjacent support.

In accordance with our invention the back wall 12 is made of sheet metal or other suitable rigid material having a series of backwardly extending reflecting cups 26 die-pressed thereinto, each cup 26 being firmly held as a part of the wall by permanent frictional engagement with a surrounding flange 28 and each having on its inside bottom wall a polished surface 30 of silver, chromium or the like for reflecting light received by said surface.

In the construction of this back wall a sheet of inexpensive metal stock is stamped so as to form a body portion 31, a side wall 32 which fits adjacent the side enclosure 18 on the front wall, and a group of openings 34 arranged to register with the openings 16 in the front wall and bordered by backwardly extening flanges 28. If desired, the side wall 32 may be extended into a marginal flange 38 lying adjacent flange 20. The cups 26 are made separately, out of lighter and more ductile metal stock than the body portion 31. Each cup consists of a bottom wall having an inside reflecting surface 30, a substantially cylindrical wall 40 and a lateral lip 42. The outside face of wall 40 initially is of slightly greater diameter than flanges 28 (see Figure 3). In combining cups 26 with the body portion 31 of this stamped metal sheet, it is necessary only to die-press the cups into the openings 34, as indicated in Figures 3 and 4. The completed back wall 12 then comprises a body portion having a group of openings adapted to register with the openings in the front wall, integral flanges extending from these openings, and cup portions permanently held in intimate frictional engagement with the flanges, the cup portions including inside reflecting surfaces, all of which are spaced uniformly from seats for the lenses. (See Figure 4.)

The distance of the spacing between lips 42 and reflecting surfaces 30 and the diameter of the lips 42 preferably are determined in relation to the radius of the spherical lenses and the index of refraction of the glass in order to provide the optimum accuracy of focus for the lenses to be seated on the cup lips.

The further assembly of the improved reflector device will now be apparent. The mere placing of lenses 14 over the openings in back wall 12 focuses the lenses accurately so that light received by them will be transmitted to the reflecting surfaces 30 and then reflected back through the lenses. The lenses may be located on the back wall, the front wall then positioned over the lenses and back wall, and the front and back walls then secured together, as by fastening elements 44. Alternatively, the lenses may be placed in the openings of the front wall and the back wall then positioned and secured thereto, which results in simultaneous nesting and focusing of all the lenses. Force-fitting of the parts into a compact, durable device in no way affects the set of the cups or the focus of the lenses relative to the reflecting surfaces in the cups. The completely assembled device appears in Figure 2. As indicated in this figure, we prefer to include in the device a perforate gasket 46, of cork or other yieldable material, which provides a cushion holding the lenses in proper position and preventing dislocation or loosening of parts of the device during use.

Another form of warning device or reflector of the type used on vehicles is illustrated in Figures 5 and 6. As indicated in the drawing, the design of the devices may be varied widely by employing different groupings of the lenses. Aside from the difference in design, the device of Figures 5 and 6 differs from that of Figures 1 to 4 only in respect of the construction of the back wall and the facilities provided for attaching the device to supporting structure. The material of the front wall 100 in this form includes a lateral extension 102, from which preferably projects a tongue 106 suitable for attachment to the usual license plate bracket of an automobile. The back wall 104 may include a forwardly extending margin 107 lying adjacent extension 102 of the front wall. The body portion 108 of back wall 104 in this embodiment is spaced considerably from the front wall and is provided with forwardly extending flanges 110 surrounding openings 112. The complete back wall is formed by die-pressing cups 114 uniformly into these openings in permanent frictional engagement with flanges 110, substantially as in the embodiment of Figures 1 to 4. In other respects, the embodiment of Figure 5 includes features of construction shown in Figures 1 to 4.

An important advantage of our improved devices is that they may be constructed from inexpensive sheet metal by simple, relatively inexpensive manufacturing operations and simple methods of assembly, yet they possess superior reflecting qualities due to the uniformly accurate focus of all the lenses, and they are extraordinarily strong and durable.

We understand that changes in details of the illustrated embodiments may be made without departing from essentials of the invention. We therefore intend that the invention be accorded a scope commensurate with the requirements of the claims.

We claim:

1. A reflecting device comprising a front wall having a series of openings therein and an angularly extended portion forming a side enclosure, another wall secured in spaced relation to the front wall and having a side portion fitting inside of and adjacent said side enclosure, a series of lenses located between and confined in place by said walls with portions of said lenses projecting through said openings, said other wall including a body portion having a series of flanged openings therein registering with said lenses, and a series of relatively ductile cups disposed inside of said flanged openings and die-pressed into permanent frictional engagement with the flanges thereof, said cups having polished reflecting surfaces inside of the same and spaced backwardly from and in uniform focused relation to said lenses.

2. A reflecting device comprising a front wall having a series of openings therein, another wall secured in parallel and spaced relation to said front wall, said other wall including a body portion having a series of annular flanges extending substantially vertically therefrom in registry with the openings in said front wall and a corresponding series of cups disposed within said annular flanges and uniformly die-pressed into permanent frictional engagement with said flanges, a series of spherical glass lenses located between and confined in place by said cups and said front wall so as to project through the openings in the latter, said cups having curved reflecting surfaces inside the same in uniformly spaced and focused relation to said lenses, and means holding the parts firmly together.

3. A reflecting device comprising a front wall having a series of openings therein and an angularly extended portion forming a side enclosure, another wall secured in spaced relation to the front wall and having a side portion fitting inside of and adjacent said side enclosure, a series of lenses located between and confined in place by said walls with portions of said lenses projecting through said openings, said other wall including a body portion having a series of flanged openings therein registering with said lenses, and a series of relatively ductile cups disposed inside said flnged openings and die-pressed into permanent frictional engagement with the flanges thereof, said cups having polished reflecting surfaces inside of the same and spaced backwardly from and in uniform focused relation to said lenses, and a layer of resilient cushioning material disposed between said walls and having a series of openings therein closely surrounding said lenses.

LOUIS J. RAUCH.
PHILIP RAUCH.